Aug. 31, 1943.    G. H. PERKINS ET AL    2,328,164
HIGH SPEED CUTTING MECHANISM
Filed Aug. 18, 1942    5 Sheets-Sheet 1
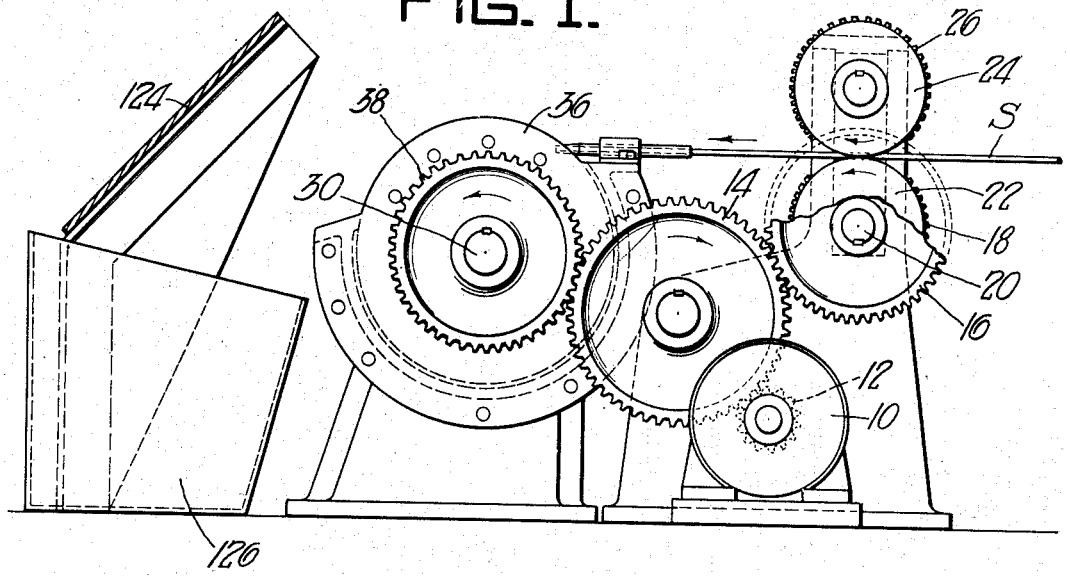
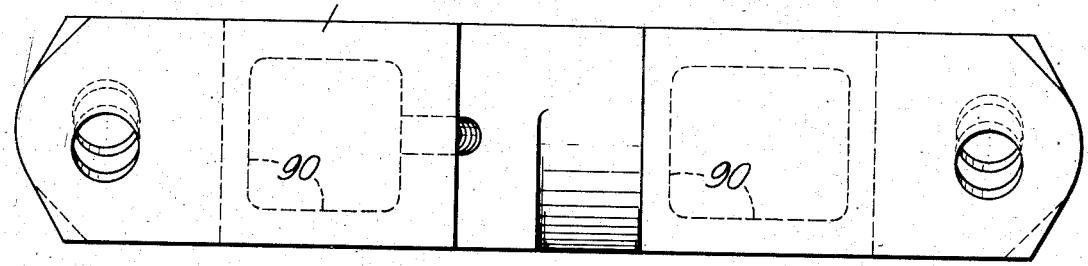
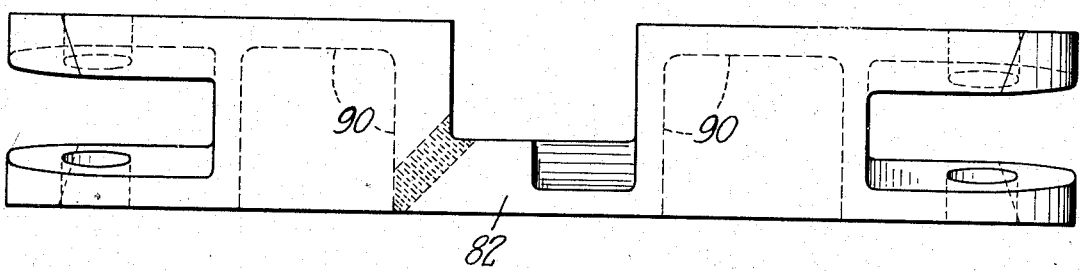
INVENTORS:
GEORGE H. PERKINS and
ALBERT L. STOECKEL,
BY John E. Jackson
THEIR ATTORNEY.

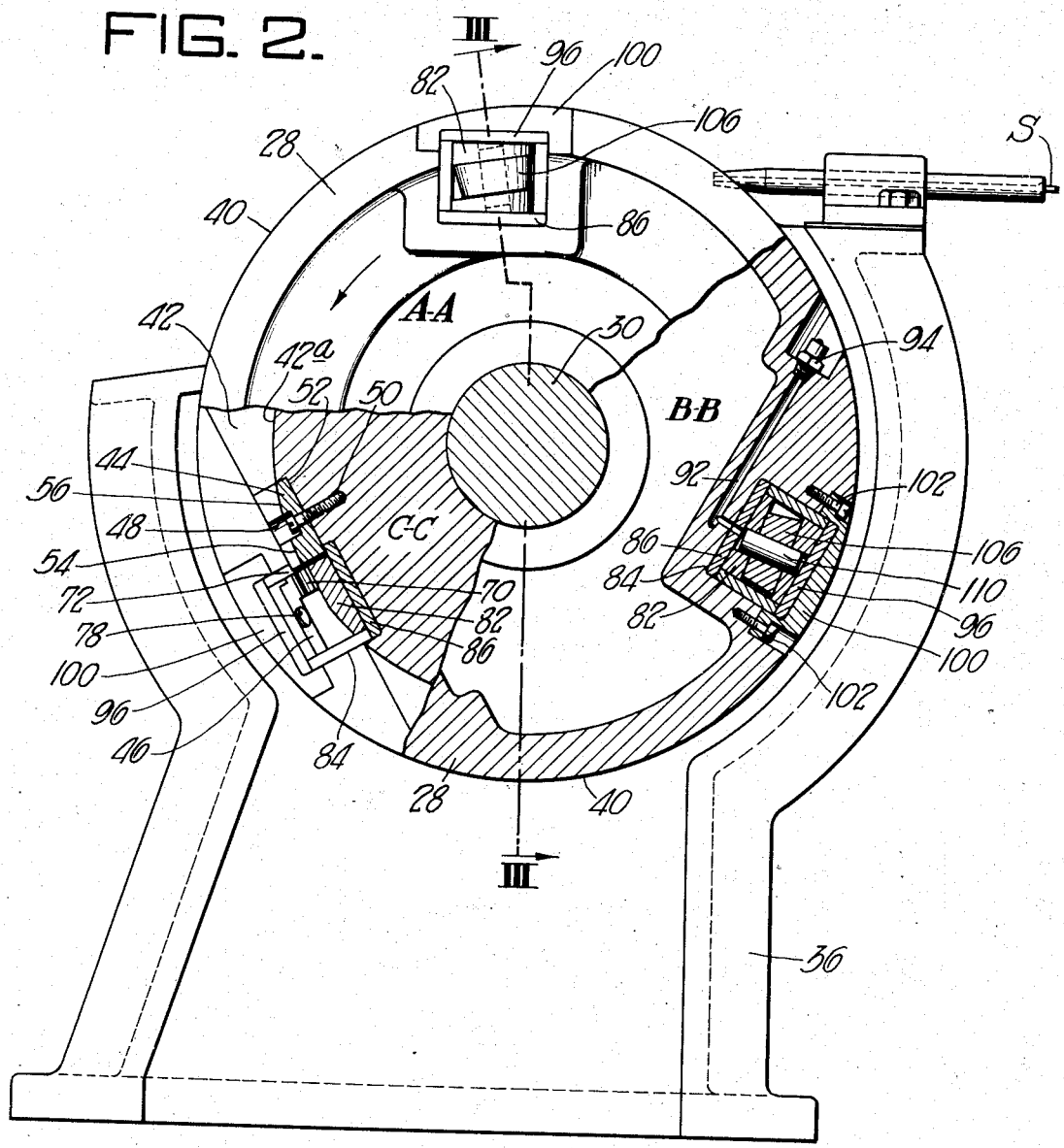

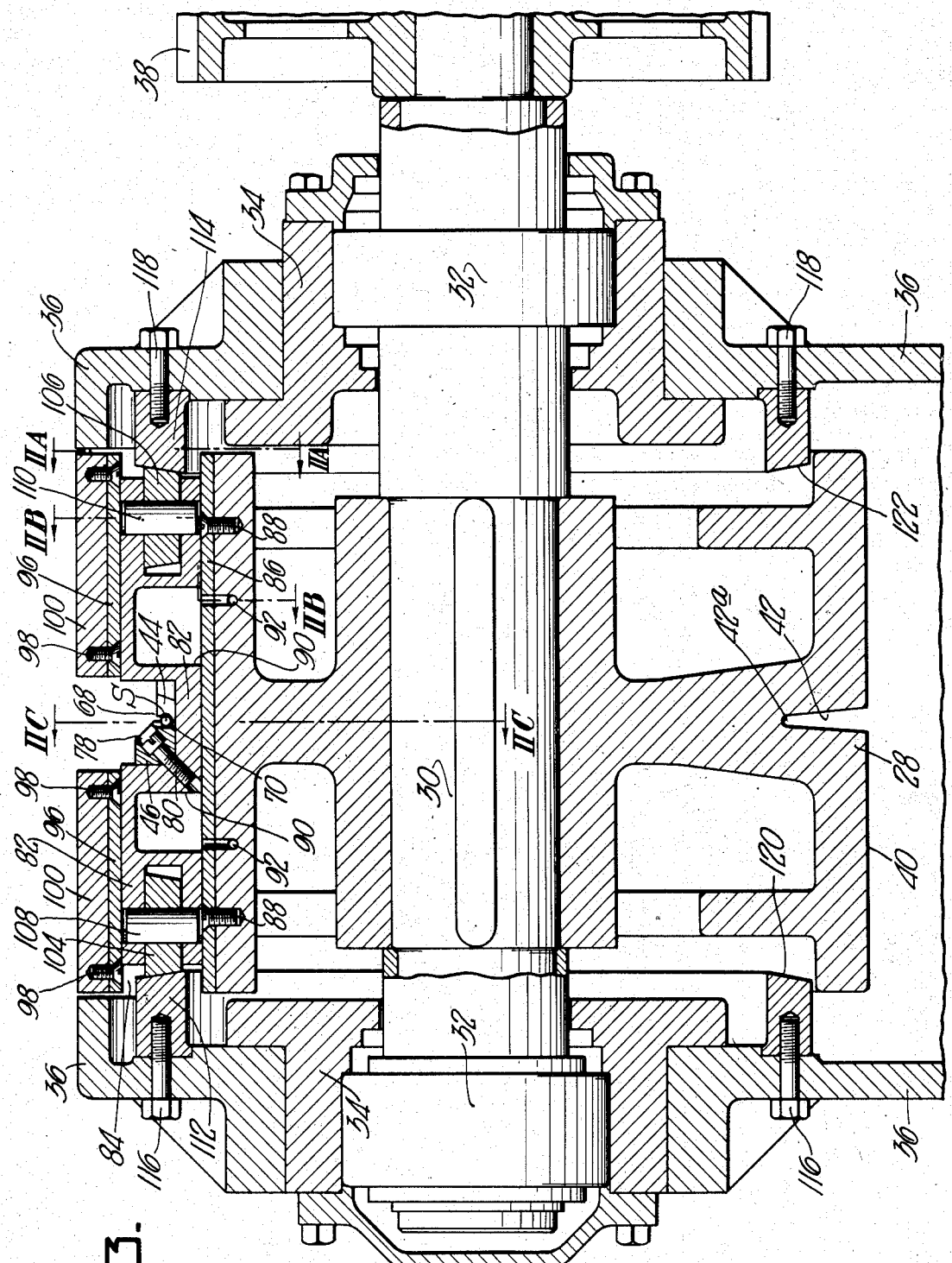

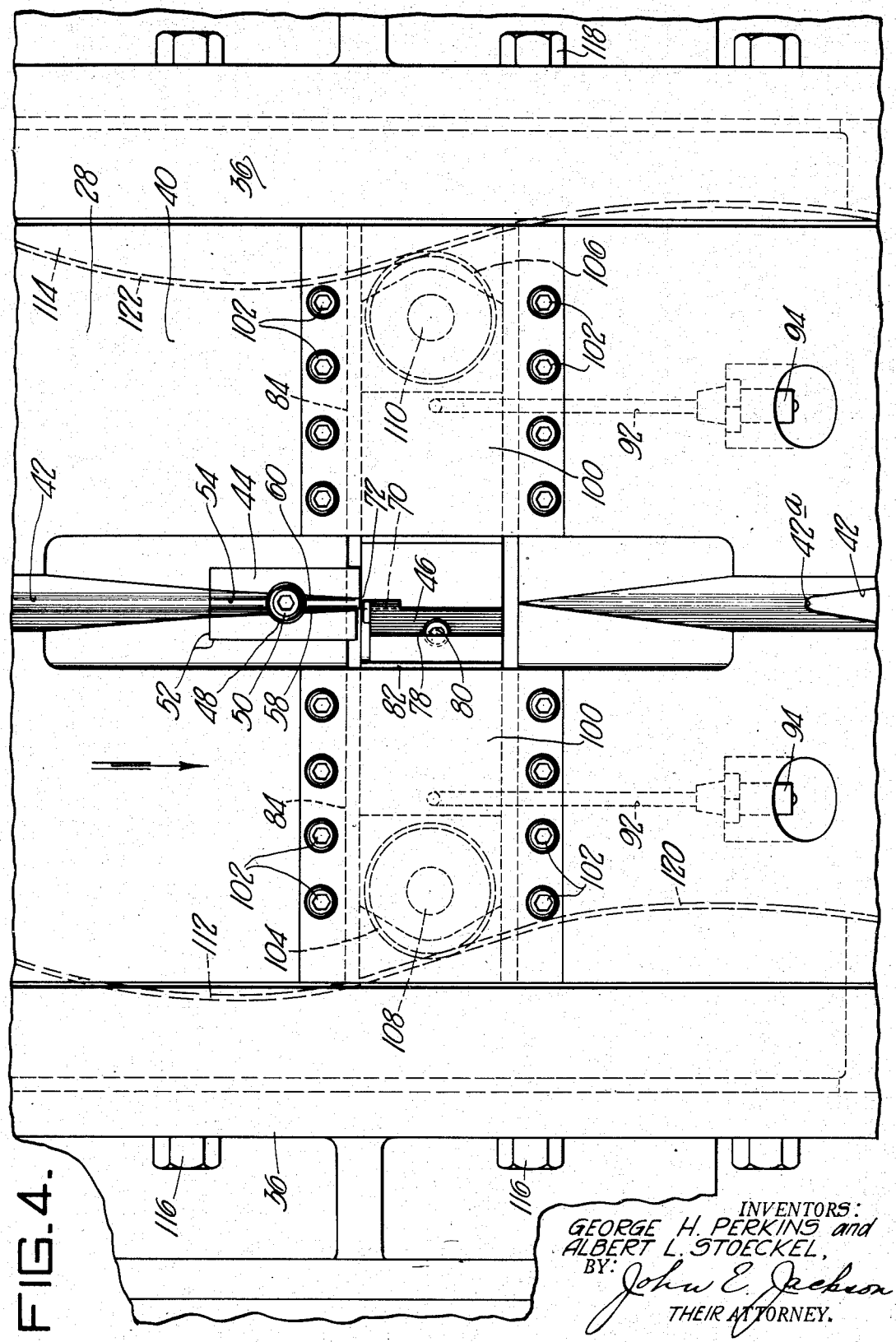

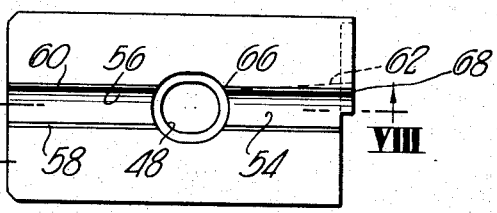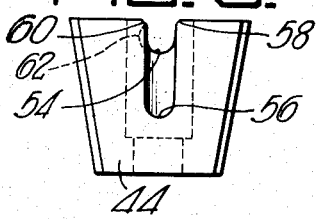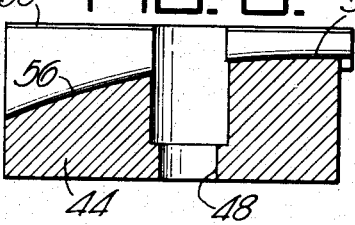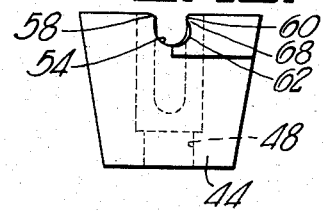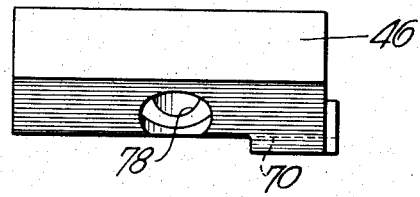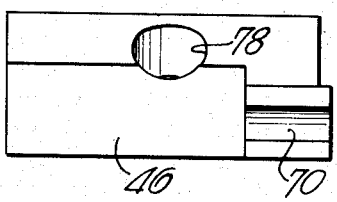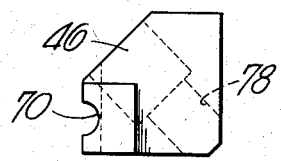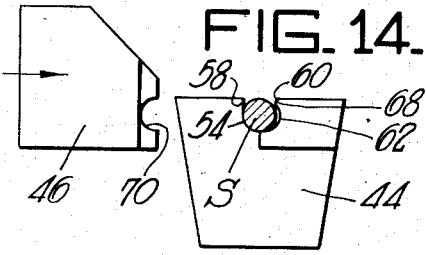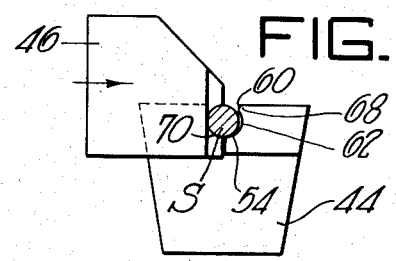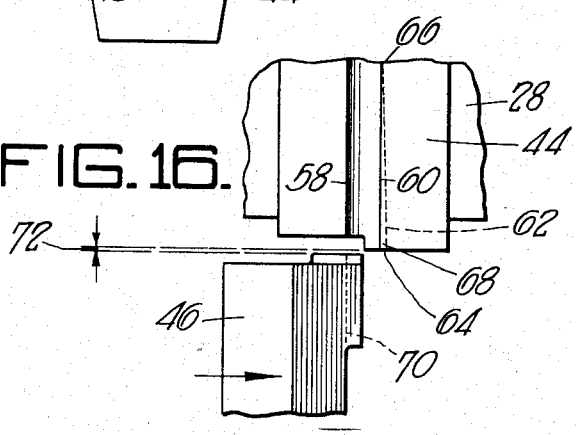

Patented Aug. 31, 1943

2,328,164

UNITED STATES PATENT OFFICE 2,328,164

HIGH SPEED CUTTING MECHANISM

George H. Perkins, Cleveland, and Albert L. Stoeckel, East Cleveland, Ohio, assignors to The American Steel and Wire Company of New Jersey, a corporation of New Jersey Application August 18, 1942, Serial No. 455,226

11 Claims. (Cl. 164—47)

The present invention relates to structural features of design and arrangement of coacting parts effective to transversely sever stock, such as rod or wire, while the same is moving longitudinally at a high rate of speed.

One object of the invention is to provide improved cutting mechanism which will rapidly sever advancing stock without the objectionable formation of a burr or flash thereon.

Another object is to provide a rotor having a peripheral guide groove therein for confining and steadying the advancing stock and carrying improved cutter blades so constructed and arranged that the moving material to be cut is backed up or supported so as to prevent the flow of metal and restrain the stock against outward radial movement during the time interval which elapses while the movable blade is severing said stock, whereby a clean line of cleavage is effected.

A further object is to provide a rotor with coacting cutting instrumentalities symmetrically arranged about the axis of rotation of the rotor so that the rotating parts are in a substantially true static balance so as to minimize vibration and thus contribute to the securing of a clean cut while the parts are rotated at a very high rate of speed.

The above and other features of the invention will be fully apparent from consideration of the following detailed disclosure, the accompanying drawings and the appended claims.

In the drawings:

Figure 1 is a side elevation with portions broken away illustrating high speed cutting mechanism embodying the present invention;

Figure 2 is an enlarged detail view of the rotor and the mounting therefor, the parts being broken away to show sections at the planes indicated at IIA—IIA, IIB—IIB, and IIC—IIC in Figure 3;

Figure 3 is a longitudinal section through the rotor and its mounting taken on line III—III of Figure 2;

Figure 4 is a plan view of the parts shown in Figure 3;

Figure 5 is a detail plan view of a movable knife support;

Figure 6 is a side elevation thereof;

Figure 7 is a detail plan view of an improved type of knife blade fixedly secured to the rotor;

Figure 8 is a section on line VIII—VIII of Figure 7;

Figures 9 and 10 are end views taken respectively from the left and right sides of Figure 8;

Figure 11 is a detail plan view of the movable blade;

Figure 12 is a side elevation thereof;

Figure 13 is an end view taken from the right of Figure 12;

Figures 14 and 15 are diagrammatic views illustrating different relative positions of the movable and fixed blade at different stages of operation thereof; and Figure 16 is a plan view of Figure 15 illustrating the extent of overhang formed by undercutting the work receiving groove and the cutter blade fixedly secured to the rotor, the view also illustrating the clearance in plan between the fixed and movable blades adapted to prevent galling and scuffing of the blades.

Referring in detail to the drawings, the numeral 10 conventionally represents any suitable type of prime mover, such as an electric motor, which is suitably connected by any conventional type of power transmission elements such as gears 12 and 14 with a gear 16 adapted to drive a gear 18 secured to a shaft 20 which carries a pinch roll 22 which coacts with a similar pinch roll 24 carrying a gear 26 which meshes with the gear 18. The coacting pinch rolls 22 and 24 are adapted to feed stock S such as rod or wire at a high rate of speed to the improved cutting mechanism of the present invention. By way of example, the pinch rolls may advance the stock longitudinally at a rate of about 700 feet per minute.

The transverse cutting of iron or steel rod or wire, while in motion at such a high rate of speed, involves problems not ordinarily encountered in cutting other materials or in cutting work while the same is intermittently held stationary or while traveling at slower speeds. One problem to be overcome is to prevent the formation of a burr or flash adjacent the line of cleavage and another problem is to prevent dislodging the work as a result of the cutting, which dislodgment would have a tendency to jam the machine and seriously interfere with the output of cut lengths of stock. The mechanism to be presently described has been demonstrated in actual practice to overcome the above problems.

The improved high speed cutting mechanism, as hereinafter more fully set forth in detail, comprises a rotor formed with an annular stock receiving guide groove in the outer peripheral face thereof, which rotor carries a knife blade fixedly secured thereto, this blade being characterized by the provision of an undercut groove thus providing an overhanging portion which effectively restrains the traveling stock against outward radial movement during the time the movable blade is penetrating and severing the stock. The several coacting blades and cutting devices carried by the rotor are spaced equal distances around the periphery and are all located equal distances from the axis of rotation and the movable blades are secured to supports which are slidable in respective straight lines disposed transversely of the work receiving guide groove formed in the face of the rotor. These features all contribute to the securing of a clean line of cleavage devoid of burr or flash when cutting longitudinally advancing work which is moving at a high rate of speed.

The rotor, indicated as a whole at 28, is keyed or otherwise secured to a shaft 30 supported on antifriction bearings 32—32 carried by bearing retainers 34—34 mounted in side frames 36—36. The shaft 30 at one end carries a gear 38 which is driven by the motor 10 through the same gearing 14 which actuates the pinch rolls 22 and 24. Thus the feed of the advancing stock is synchronized with the rotary movement of the rotor 28.

The outer peripheral face 40 of the rotor is grooved, as indicated at 42, so as to provide a confining annular guideway for the rapidly advancing stock S and thus prevents any undesired lateral movement of the portions of the stock during and after the severing operation.

In the embodiment of the invention illustrated, the rotor is provided with three coacting fixed and movable cutter blades, the cutter assemblages being equally spaced around the periphery. All of these cutter blades are also located equal distances from the axis of rotation of the rotor. Since the three sets of cutter blades are of identical construction, a detailed description of one will suffice for all.

While three sets of coacting blades are shown, it will be understood that a fewer or greater number may be used. The number of cutters used will be varied in accordance with the diameter of the rotor and the particular lengths of rod stock to be severed, it being obvious that the length between the ends of each section or rod cutter will correspond to the peripheral distance between the cutting edges of adjacent blades carried by the rotor.

The blades, which are fixedly secured to the rotor, are indicated at 44, and the movable blades are indicated at 46. Each fixed blade is provided with an aperture 48 to permit the passage therethrough of a cap screw 50, the threads of which engage suitable threads tapped in the body of the rotor 28. The rotor is provided with a recess 52 to receive and position the fixed blade.

As shown in Figures 2 and 7 through 10, each fixed blade is formed with a longitudinally extending groove 54, the innermost portion 56 of which is curved on the same radius as the base of the groove 42a of the guide groove 42 formed in the rotor. The outer edges 58 and 60 of the guide groove 54 are parallel to one another, but are chamfered off to facilitate ease of engagement between the fixedly mounted blade and the advancing wire to be cut.

A particular feature of the present improvement which practice has demonstrated to be highly important in the securing of a clean line of cleavage devoid of burr or flash is the provision of an undercut portion in the groove of the fixedly mounted blade, which portion is indicated by the dotted line 62. The maximum amount of lateral offset of the undercut portion is located immediately adjacent the plane of cleavage indicated at 64 in Figure 16. This undercut line 62 tapers gradually until it coincides at the point 66 with one of the parallel side walls of the groove 54, as indicated in Figures 7 and 16. The thus formed undercut groove provides an overhanging portion 68 which slightly overlaps the circular rod or wire being cut. This overhang thus backs up or supports the rod or wire at the time it is being severed. In other words, during the time the knife blade 46 is moving transversely of the wire or rod stock S to sever the same, the overhang 68 restrains the stock against outward movement. Thus the coaction prevents the formation of burr or flash. This desirable action is secured by preventing the metal of the stock from "flowing" at the time of cleavage or during the penetration of the stock by the moving knife blade 46.

The movable knife blade, as best shown in Figures 3 and 11 through 13, is provided with a substantially semicircular groove 70 of a radius to suit the diameter of the rod or wire being cut. During the short interval of time required to effect a complete cleavage it will be understood that because of the overhang provided in the fixed blade and the semicircular formation of the groove 70 in the movable blade, the circular rod or stock will be approximately entirely encircled while the severing action is taking place. We regard it important to have a slight clearance, as indicated in Figure 16 at 72, between the planes of the opposing end faces 74 and 76 of the fixed and movable blades 44 and 46. Such clearance avoids the galling or scuffing of the blades.

The movable blade 46 is apertured at 78 and a cap screw 80 passes through the aperture and is tapped into a suitably threaded hole formed in a holder 82. This movable blade holder is slidable in a guide groove 84 disposed transversely of the annular work receiving groove 42 formed in the face of the rotor.

In the embodiment of the invention illustrated, the guide groove is perpendicular to the groove 42 in the rotor and is parallel to the axis of rotation of the rotor. It is to be understood, however, that if it is desired to cut work on an angle, the guide groove 84 will be disposed other than perpendicular to the groove 42.

Each movable blade holder 82 rides on a wear plate 86 secured by screws 88 to the body of the rotor. The carrier is provided with a number of lubricant receiving chambers 90 and lubricant is adapted to be forced into the chambers through passageways 92, a suitable fitting 94 of conventional form being provided for coaction with a known type of grease gun. Wear plates 96 are secured by screws 98 to cover plates 100 which are made fast to the body of the rotor by socketed set screws 102, as shown in Figure 4.

Cam follower rollers 104 and 106 journaled on pins 108 and 110 secured at the opposite ends of the movable blade holder are adapted to coact with respective fixed complementary cams 112 and 114 which are secured by bolts 116 and 118 to the side frames 36—36. As thus arranged it will be apparent that upon rotation of the shaft 30 the turning movement of the rotor will cause the rollers 104 and 106 to traverse the cam faces of the cams 112 and 114. These cam faces have undulated parallel active complementary portions such as indicated at 120 and 122 so plotted as to cause a properly accelerated motion to be transmitted to the movable blade holder in a manner calculated to rapidly sever the longitudinal advancing rod or wire stock S. After each predetermined length of rod or wire is severed, its momentum carries it forward until it strikes a fixed deflector plate 124 which directs the same to a storage receptacle or shipping container 126.

While we have described quite specifically a preferred construction which an actual reduction to practice has shown to be highly desirable, it is not to be construed that we are limited thereto since various modifications and substitutions of equivalents may be made by those skilled in the art without departure from the invention as defined in the appended claims.

We claim:

1. High speed cutting mechanism for severing longitudinally moving stock, comprising a rotor carrying respective fixed and movable blades, one blade being undercut to provide a portion which overhangs the advancing stock so as to back up and thus restrain the same from outward radial movement during the time interval which elapses while the movable blade is severing said stock, whereby a clean line of cleavage devoid of burr or flash is effected.

2. High speed cutting mechanism for severing longitudinally advancing round wire or rod stock, comprising a rotor having a circumferential groove therein adapted to receive the advancing stock, a movable blade having a semicircular cutting recess therein mounted for axial movement relatively to the rotor in a straight line perpendicular to said circumferential groove, a knife blade fixedly secured to the rotor and having an undercut curved recess formed therein of a size and shape to suit the diameter of the stock to be cut and to provide an overhanging portion adapted to restrain the stock against outward radial movement while the movable blade is severing such stock, whereby a clean line of cleavage devoid of burr or flash is effected.

3. High speed cutting mechanism for severing longitudinally moving stock, comprising a rotor having an annular stock receiving guide groove formed in the outer face thereof, a blade fixedly secured to said rotor, a movable blade and means for guiding it in a straight line transverse to the axis of the moving stock, one blade having a grooved throat of a cross sectional contour to match the contour of stock and including a portion which overhangs the stock so as to back up and thus restrain the metal from flowing to prevent outward radial movement of the stock during the time interval which elapses while the movable blade is severing said stock, whereby a clean line of cleavage devoid of burr or flash is effected.

4. High speed cutting mechanism for severing longitudinally moving stock, comprising a rotor having an annular stock receiving guide groove formed in the outer face thereof, a knife blade fixedly secured to said rotor, a movable blade and means for guiding it in a straight line transverse to the axis of the moving stock, one of said blades being undercut to provide an overhanging portion adapted to overlap a portion of the advancing stock and restrain the metal from flowing during the severing of said stock, whereby a clean line of cleavage devoid of burr or flash is effected.

5. High speed cutting mechanism for severing longitudinally moving stock comprising a rotor having an annular stock receiving guide groove formed in the outer face thereof, a knife blade fixedly secured to said rotor, a movable blade for coaction therewith, a holder supporting the movable blade, guide means coacting with said holder extending axially across the face of said rotor, and complementary fixed means adjacent opposite ends of the rotor for sequentially shifting said holder positively in opposite directions in a path transversely to the longitudinal axis of the stock to be cut.

6. High speed cutting mechanism for severing longitudinally moving stock comprising a rotor having an annular stock receiving guide groove formed in the outer face thereof, a knife blade fixedly secured to said rotor on one side of said guide groove, a movable blade on the opposite side of said groove for coaction with said fixed blade, a holder supporting the movable blade, guide means coacting with said holder extending axially across the face of said rotor, and complementary fixed cams adjacent opposite ends of the rotor for shifting said holder in a straight line substantially perpendicular to the stock to be cut, said holder having rollers journaled therein for coaction with said cams.

7. High speed cutting mechanism for severing longitudinally moving stock comprising a rotor carrying respective fixed and movable blades, respective guiding and supporting means for said blades so constructed and arranged that the opposing coacting end faces of said fixed and movable blades have an appreciable clearance space or gap between them to thereby prevent galling and scuffing thereof.

8. High speed cutting mechanism for severing longitudinally advancing stock comprising a rotor, a plurality of respective coacting pairs of cutter blades located at equal circularly spaced distances around the periphery of the rotor, the several pairs of blades being located equal radial distances from the axis of rotation of the rotor, each pair comprising one blade fixedly secured to the rotor and another blade movable in a straight line lengthwise of the rotor, respective holders slidably mounted in guides formed in the rotor supporting the movable blades with freedom for such straight line movement, and complementary fixed cams mounted adjacent each end of the rotor for coaction with said holders, each holder having follower rollers journaled at the ends thereof for coaction with said cams.

9. High speed cutting mechanism for severing longitudinally advancing stock comprising a rotor having a circumferential stock receiving guide groove formed in the outer face thereof, a cutter blade fixedly secured to the rotor and having an undercut groove therein, a portion of which is aligned with said guide groove, a holder slidably mounted in a guideway disposed transversely of the groove in the rotor, a blade secured to said holder, and means whereby rotation of the rotor reciprocates said holder back and forth in a straight path across said guide groove.

10. High speed cutting mechanism for severing longitudinally advancing stock comprising a rotor having a circumferential stock receiving guide groove formed in the outer face thereof, a cutter blade fixedly secured to the rotor and having an undercut groove therein, a portion of which is aligned with said guide groove, a holder slidably mounted in a guideway disposed transversely of the groove in the rotor, a blade secured to said holder, fixed cams adjacent each end of the rotor, the working faces of said cams being parallel and facing one another, and cam follower rollers secured to the opposite ends of said holder for coaction with said fixed cams.

11. High speed cutting mechanism for severing longitudinally advancing stock comprising a rotor having a circumferential stock receiving guide groove formed in the outer face thereof, a cutter blade fixedly secured to the rotor, a guideway in the rotor disposed transverse to said groove, a holder slidable therein carrying a blade for coaction with said fixed blade, the guideway in the rotor having a replaceable wear plate secured therein on which said holder slides, the holder having a lubricant receiving chamber therein, the rotor and the wear plate having lubricant passageways therein, and a fitting secured to the rotor to facilitate the introduction of lubricant through said passageways to said chamber.

GEORGE H. PERKINS.
ALBERT L. STOECKEL.